(12) United States Patent
Hatakeyama et al.

(10) Patent No.: US 7,022,932 B2
(45) Date of Patent: Apr. 4, 2006

(54) OUTER SHELL UNIT AND METHOD OF MANUFACTURING THE UNIT

(75) Inventors: Toshihiko Hatakeyama, Tokyo (JP); Yoshio Ariura, Tokyo (JP); Shinji Owaki, Tokyo (JP); Yasuhide Kawabe, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/451,886

(22) PCT Filed: Dec. 26, 2001

(86) PCT No.: PCT/JP01/11456

§ 371 (c)(1),
(2), (4) Date: Jun. 26, 2003

(87) PCT Pub. No.: WO02/052166

PCT Pub. Date: Jul. 4, 2002

(65) Prior Publication Data
US 2004/0045778 A1 Mar. 11, 2004

(30) Foreign Application Priority Data

Dec. 26, 2000 (JP) ............................. 2000-394698
Dec. 26, 2000 (JP) ............................. 2000-394715
Dec. 26, 2000 (JP) ............................. 2000-394722
Jan. 23, 2001 (JP) ............................. 2001-014369

(51) Int. Cl.
*B23K 9/00* (2006.01)
*B23K 31/02* (2006.01)

(52) U.S. Cl. ..................................... 219/61; 228/173.4

(58) Field of Classification Search .................. 219/61, 219/137 R; 228/173.1, 173.2, 173.4, 129
See application file for complete search history.

(56) References Cited

U.S. PATENT DOCUMENTS

| 4,168,795 | A | * | 9/1979 | Bennett ...................... 228/175 |
| 4,884,665 | A | * | 12/1989 | Parker et al. .......... 188/322.17 |
| 5,669,728 | A | * | 9/1997 | Koba ......................... 403/270 |
| 5,990,441 | A | * | 11/1999 | Zaenglein et al. ....... 219/78.16 |
| 6,217,012 | B1 |   | 4/2001 | Hashirayama .............. 267/221 |
| 6,533,230 | B1 | * | 3/2003 | Fullenkamp et al. ....... 248/300 |
| 6,548,780 | B1 | * | 4/2003 | Lewis ......................... 219/93 |
| 6,559,418 | B1 | * | 5/2003 | Sorg ........................... 219/149 |

FOREIGN PATENT DOCUMENTS

| JP | 53-53530 | 12/1978 |
| JP | 55-045524 | 3/1980 |
| JP | 2000-046090 | 2/2000 |
| JP | 2000-211333 | 8/2000 |

* cited by examiner

Primary Examiner—Kevin P. Kerns
(74) Attorney, Agent, or Firm—Rabin & Berdo, PC

(57) ABSTRACT

A manufacturing method for an outer shell unit (10) provided with a cylindrical outer shell (3) housing a damping force generating mechanism and a knuckle bracket (7) mounted on the outer shell (3) to connect a knuckle. The knuckle bracket (7) is fixed by welding to the outer shell (3) after closing the bottom (31) of the outer shell (3) with a closing process. Consequently productivity is increased due to the fact that the number of processing operations for cutting an inlay and the number of operations for assembling the lower cap are reduced because the bottom is formed using a closing process. Furthermore productivity is increased since it is not necessary to seal the bottom by welding since the sealing characteristics of the bottom of the outer shell are ensured by the closing process.

10 Claims, 20 Drawing Sheets

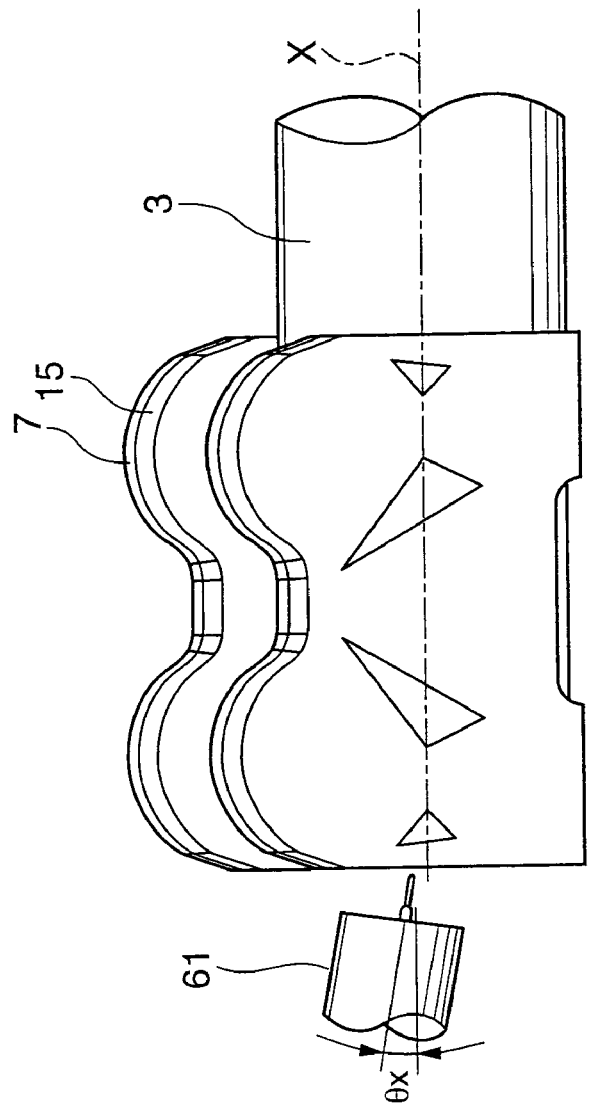
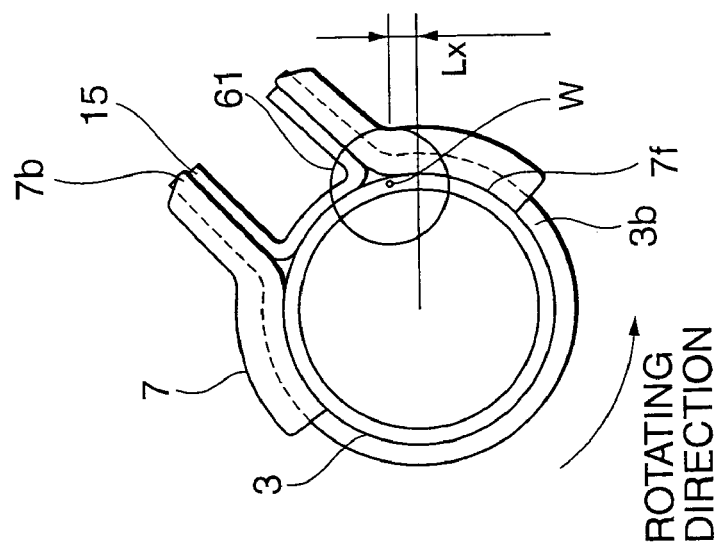
FIG.10B
FIG.10A

PRIOR ART

ROTATING DIRECTION

OUTER SHELL UNIT AND METHOD OF MANUFACTURING THE UNIT

FIELD OF THE INVENTION

This invention relates to an outer shell unit provided with a shock absorber which absorbs vibration or impacts. In particular, this invention relates to a structure and a method of manufacture therefore as applied to an outer shell unit provided with a strut-type shock absorber in the suspension system of a vehicle.

BACKGROUND OF THE INVENTION

In addition to their original function of generating a damping force, strut-type shock absorbers in the suspension system of a vehicle also play a role as a structural member positioning the vehicle wheels as a component in the suspension member.

FIG. 16 shows a prior-art example of a strut-type shock absorber 1. The outer side of this shock absorber 1 is provided with an outer shell unit 10 storing a damping force generating mechanism. The outer shell unit 10 is provided with a cylindrical outer shell 3, a spring guide 6 mounted by welding onto the outer shell 3 and supporting a suspension spring and a knuckle bracket 7 mounted by welding on the outer shell 3 and connected to a knuckle.

The knuckle bracket 7 is fixed by welding after press-fitting onto the outer shell 3. The upper and lower ends 7e, 7f of a single-plate type of knuckle bracket 7 are respectively fixed to the outer shell 3 by welding.

Inlays 32, 37 are formed by a mechanical process on both ends of the outer shell 3. A rod guide 9 is mounted on the upper end of the inlay 32. A lower cap 27 is mounted on the lower end of the inlay 37 (see FIG. 19). The outer peripheral section of the lower cap 27 is welded to the lower end of the outer shell 3 together with the lower end 7f of the knuckle bracket 7 and the bottom of the outer shell 3 is sealed.

As shown in FIGS. 17(a) and (b), the outer shell 3 is rotated about the substantially perpendicular center axis O when welding the upper end 7e of the knuckle bracket 7 to the outer shell 3. A flat welding technique is employed in which the torch 61 of the arc-welding unit is oriented downwardly towards the corner between the outer peripheral face 3a of the outer shell 3 and the upper end 7e of the knuckle bracket 7. The shape of the welded section is in the form of a lap weld with a partial fillet weld.

As shown in FIGS. 18(a) and (b), when welding the lower end 7f of the knuckle bracket 7 and the lower cap 27 across the entire periphery of the outer shell 3, the outer shell 3 is rotated about the center axis O which is inclined through an angle of 60 degrees with respect to the horizontal plane. A flat welding technique is employed in which the torch 61 of the arc-welding unit is oriented downwards towards the corner between the lower end 3b of the outer shell 3, the lower end 7f of the knuckle bracket 7 and the lower cap 27. The shape of the welded section has a specific shape comprising a characteristic flare, a lap weld and a partial fillet weld. Consequently highly accurate welding techniques and considerable welding time is required.

As shown in FIGS. 18(b), (c), the lower end 6a of the spring guide 6 is welded simultaneously with the above at three positions to the outer peripheral face 3a of the outer shell 3. The shape of this welded section is in the form of a lap weld.

The assembly line process for the outer shell 3 comprises the steps in ①②③④⑤⑥⑦ as shown in FIG. 19 and FIG. 20.

① A pipe member is cut through in order to form a work 41 comprising a right circular cylinder.

② A drawing operation is performed along the work 41 in order to form a narrow radius section 38.

③ A drawing operation is performed on the lower end of the work 41 in order to form a narrow radius section 39.

④ A cutting operation is performed on the inner periphery of the lower end of the work 41 in order to form an inlay 37.

⑤ A cutting operation is performed on the inner periphery of the upper end of the work 41 in order to form an inlay 32. A rod guide 9 is engaged to the inlay 32 in a separate step.

⑥ The work 41 is cleaned with a flushing operation.

⑦ The lower cap 27 is press fitted to the inlay 37 of the work 41 and fixed by a caulking operation.

The above steps are all automatically performed in a single production line.

The welding line for the outer shell unit 10 comprises the steps in ①②③④⑤⑥⑦⑧ as shown in FIG. 20.

① A number or identification sign of the component is stamped on the work 41.

② The knuckle bracket 7 is press fitted to the outer shell 3.

③ The upper end 7e of the knuckle bracket 7 is welded to the outer shell 3.

④ The lower end 7f of the knuckle bracket 7 and the lower end 6a of the spring guide 6 are welded at the same time to the outer shell 3. The upper end 7e of the knuckle bracket 7 and the lower end 6a of the spring guide 6 are welded at the same time to the outer shell 3.

⑤ A leakage test is performed in order to confirm the sealing characteristics of the bottom of the outer shell 3 and the work 41 is cleaned as above.

⑥ A drilling operation is performed on each bolt hole 7c, 7d in the knuckle bracket 7.

⑦ The width between respective flanges 7b and the knuckle bracket 7 is corrected.

⑧ A hose bracket is welded to the outer shell 3.

The above steps are all automatically performed in two production lines.

OBJECT OF THE INVENTION

However the prior-art method of producing an outer shell unit requires time in order to weld the spring guide 6 and the knuckle bracket 7 in the welding line to the outer shell 3. Consequently it is necessary to provide for two welding lines as opposed to a single processing line in order to maintain productivity.

In particular, due to the fact that material strength as well as sealing characteristics are required in the welded section in which the lower end 7f of the knuckle bracket 7 and the lower cap 27 are welded across the entire periphery of the outer shell 3, it is difficult to increase the speed of welding operations and consequently the cycle time in the welding line increases. It is therefore an object of this invention to provide a highly productive method of manufacturing an outer shell unit.

It is therefore an object of this invention to provide a highly productive method of manufacturing an outer shell unit.

It is a further object of this invention to provide an outer shell unit which displays high productivity.

DISCLOSURE OF THE INVENTION

This invention increases productivity by reducing the number of cutting operations on an inlay and the number of processes for assembling the lower cap by forming a bottom using a closing process.

Since the sealing characteristics of the bottom of the outer shell are maintained when using a closing process, it is possible to increase productivity due to the fact that it is not required to seal the bottom by welding.

Since the lower end of the outer shell is drawn into a tapering shape by the closing process, it is possible to perform a smooth press-fitting operation of the knuckle bracket onto the outer shell. Consequently the reduction in the number of drawing operations applied to the outer shell improves productivity.

Since the sealing characteristics of the bottom of the outer shell in this invention are maintained by the closing process, it is not required to seal the bottom by welding. Thus it is possible to perform high-speed welding operations and shorten the cycle time in the welding line by using a method of vertical downward welding.

This invention provides a protrusion projecting from the bottom of the outer shell in order to ensure sealing characteristics of the bottom. Furthermore the structure is simplified since it is possible to directly engage the knuckle with the outer shell by providing a threaded section in the

BRIEF DESCRIPTION OF THE DRAWINGS

FIG. 10 shows a method of high-speed welding of the lower end of the knuckle bracket to the outer shell according to another embodiment.

BEST METHOD FOR CARRYING OUT THE INVENTION

In order to describe the invention in greater detail, the preferred embodiments will be outlined below with reference to the accompanying drawings.

Figure 1:
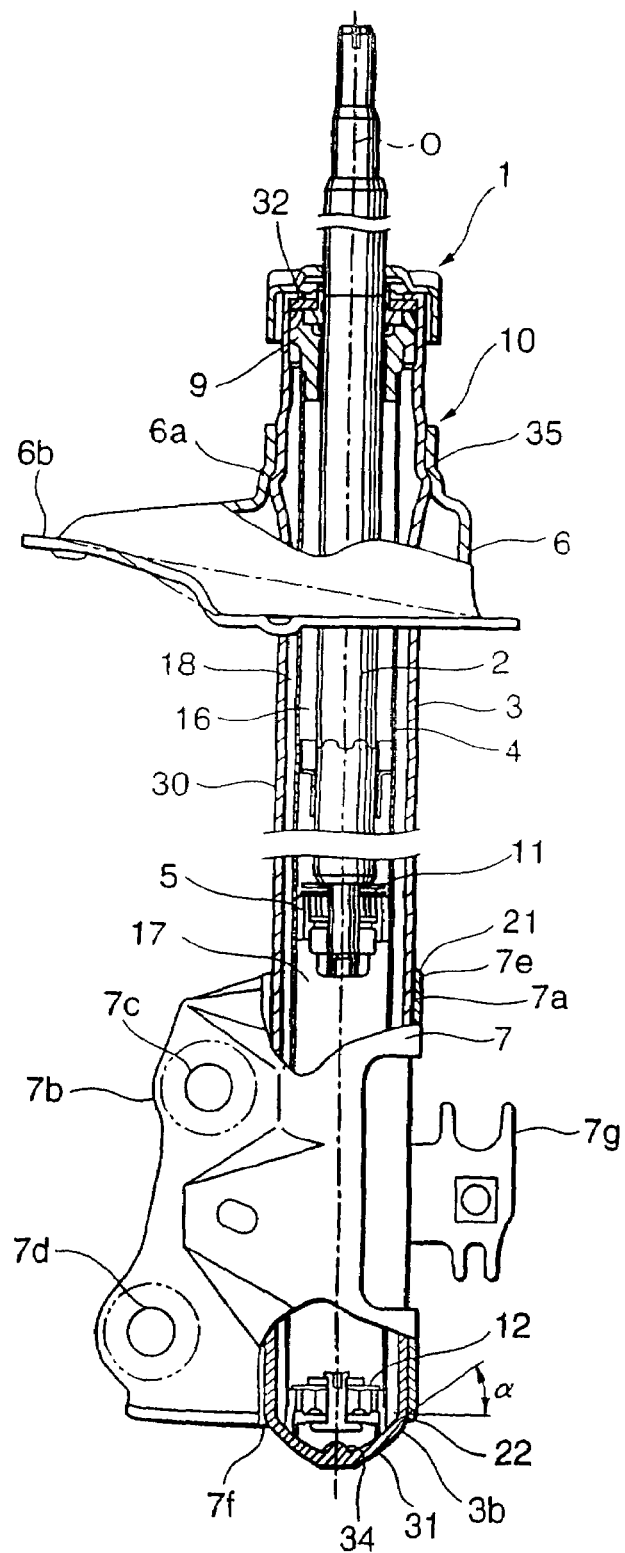
FIG. 1 is a cross-sectional view of a preferred shock absorber according to this invention.

FIG. 1 shows a cross section of a shock absorber. This strut-type shock absorber 1 is provided with a rod 2 connected to the vehicle body, an outer shell 3 connected to the knuckle (not shown) which supports the vehicle shaft, a rod guide 9 which supports the rod 2 to slide freely on the outer shell 3, an inner tube 4 which partitions an oil storage chamber 18 with gas enclosed in a section on the inner side of the outer shell 3, a piston 5 which is connected to the tip of the rod 2 and which partitions the inner section of the inner tube 4 into an upper oil chamber 16 and a lower oil chamber 17, a piston valve 11 which generates a damping force during an extension stroke and a base valve generating a damping force during a compression stroke. The shock absorber 1 comprises a damping force generating mechanism in the outer shell 3 for damping vibrations on the vehicle wheels.

During an extension stroke in which the rod 2 displaces upwardly, the upper oil chamber 16 is pressurized and working oil flows into the lower oil chamber 17 through the piston valve 11 in order to generate a damping force. During this operation, working oil corresponding to the retraction of the rod 2 opens the base valve 12 from the oil storage chamber 18 and flows into the lower oil chamber 17 almost without resistance.

During a compression stroke in which the rod 2 displaces downwardly, working oil in the lower oil chamber 17 opens the piston valve 11 and flows into the upper oil chamber 16 almost without resistance. During this operation, working oil corresponding to the intrusion of the rod 2 flows into the oil storage chamber 18 through the base valve 12 from the lower oil chamber 17 in order to generate a damping force.

The strut-type shock absorber 1 is provided with a spring guide 6 supporting the lower end of a suspension spring and a knuckle bracket 7 connected to the knuckle. The shock absorber 1 plays the role of positioning the vehicle wheels by acting as a section of a suspension member.

An annular step 35 is formed by extrusion molding with a blister process alone the outer shell 3. The spring glide 6 is fixed by press fitting to the step 35. In this manner, it is not necessary to weld the spring guide 6 to the outer peripheral face 3a of the outer shell 3.

Figure 2:
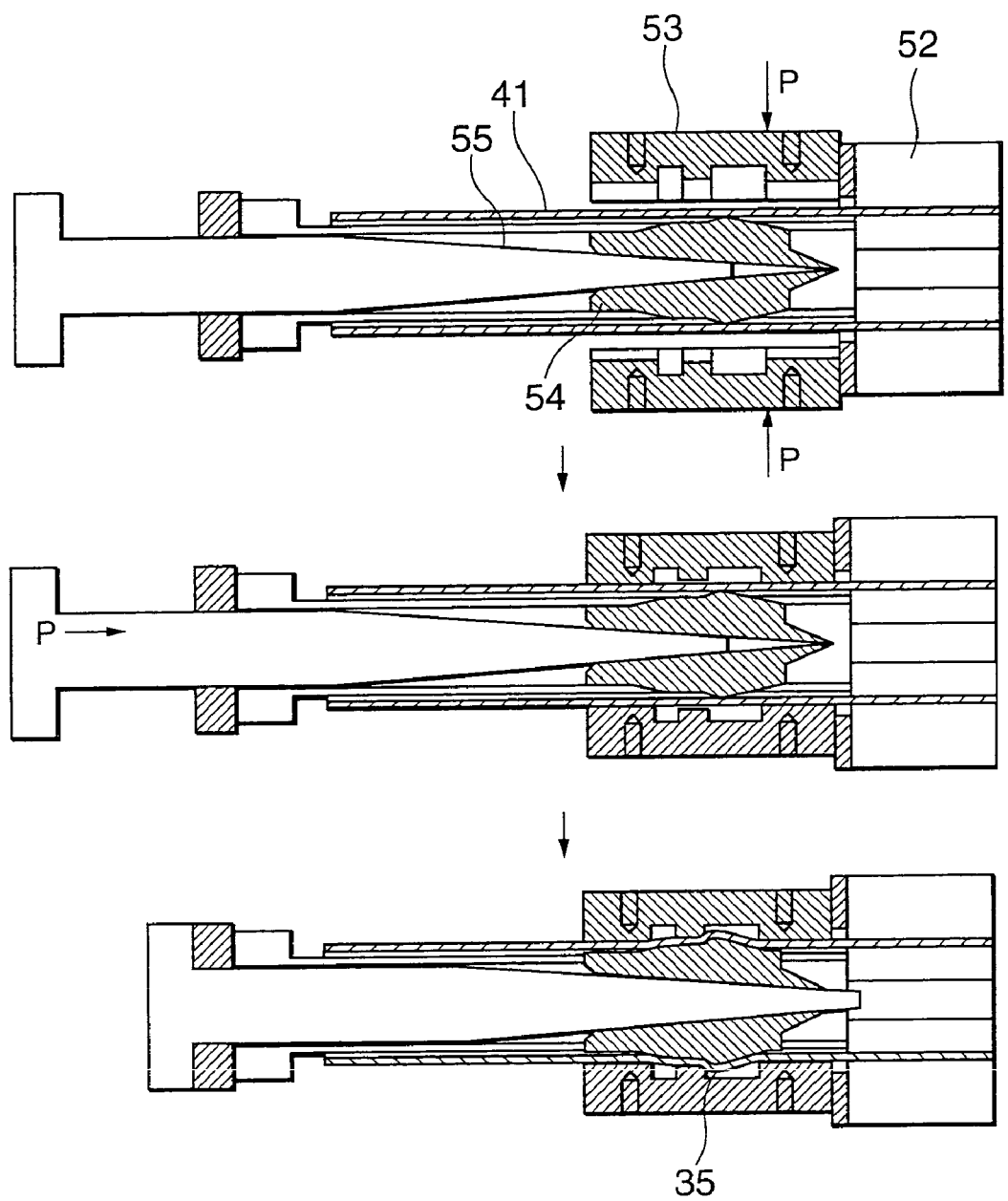
FIG. 2 shows the process of forming a step using a blister operation.

FIG. 2 shows a process for forming a step 35 using a blister operation, i.e., bulge forming. The blister operation unit comprises a jig 52 retaining a work 41 such as a pipe member, an outer mold 53 encircling the outer side of a work 41, an inner mold 54 disposed on the inner side of a work 41 and a wedge-shaped engaging member 56 which displaces the inner mold 54 in a radial direction. A work 41 retained on the jig 52 is encircled by the outer mold 53, the inner mold 54 is disposed on the inner side of the work 41 and the engaging member 56 is pressed by a force P onto the inner mold 54. As a result, the inner mold 54 expands radially and a step 35 is formed by the resulting swelling along the work 41 in an annular shape corresponding to the shape of the outer mold 53 and the inner mold 54.

The spring guide 6 has an engaging section 6a which engages with the outer shell 3 and a sheet 6b which supports the lower end of the suspension spring. The spring guide 6 is integrated by a pressing operation.

The outer shell 3 has a cylindrical main body 30 and a bottom 31 which covers the lower end of the main body 30. The bottom 31 of the outer shell 3 is integrated to the main body 30 of the outer shell 3 by a plastic process or plastic forming termed a closing process. In this manner, the sealing characteristics of the bottom 31 of the outer shell 3 can be maintained and it is therefore not required to seal the bottom 31 by welding.

Figure 3:
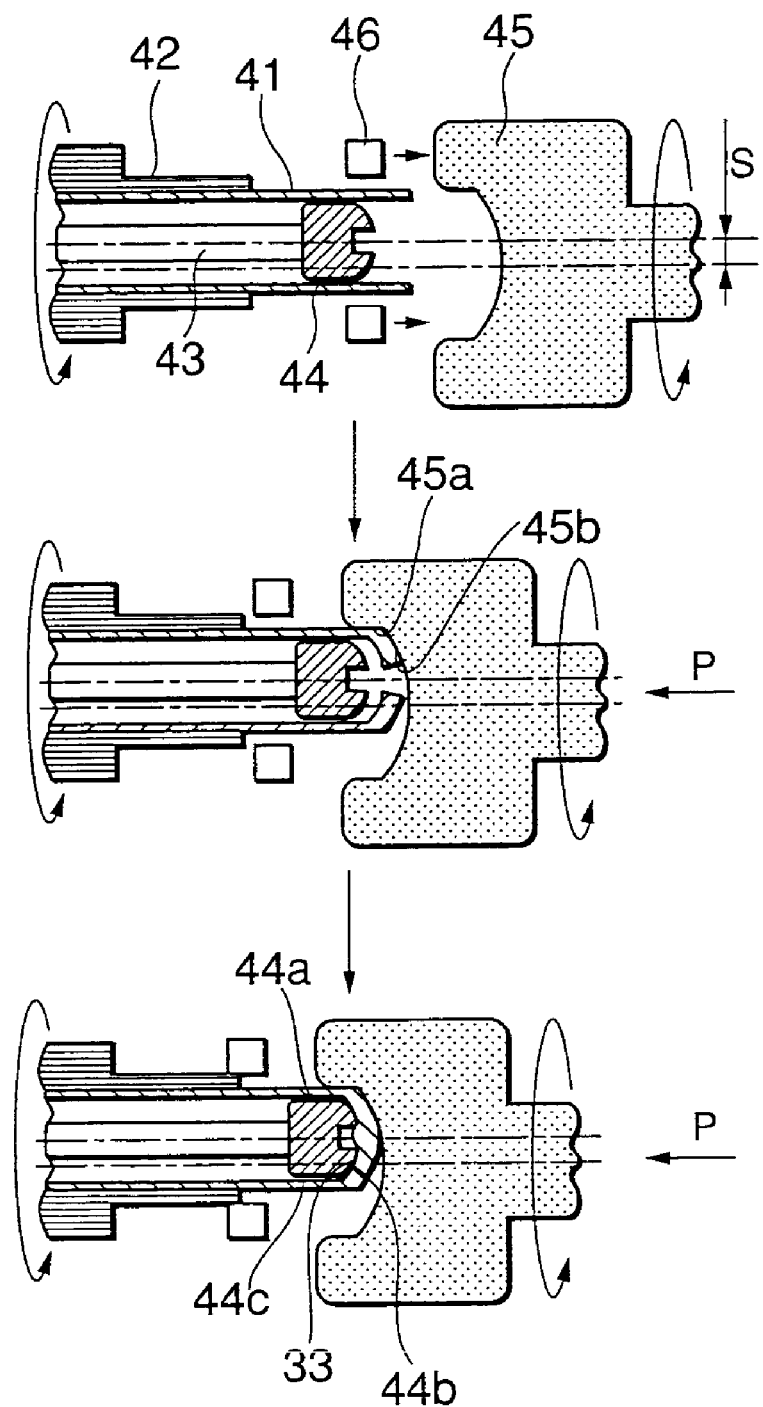
FIG. 3 shows the process of forming a bottom using a closing process.

FIG. 3 shows the process of forming a bottom 31 using a closing process. The device used in the closing process comprises a chuck 42 retaining a work 41 such as a pipe member, a cored bar 44 disposed coaxially with respect to the work 41 by a retaining bar 43 on the inner side of the work 41, a die 45 rotating about a shaft having a predetermined offset S from the work 41 and a heating coil 46 heating the die 43. The work 41, the cored bar 44 and the die 45 are rotated in the same direction.

The die 45 has an inner peripheral face 45a formed in a concave cylindrical shape and a curved face 45b formed in a substantially concave spherical shape. The cored bar 44 has a cylindrical outer peripheral face 44a, a curved face 44b projecting substantially in the shape of a sphere and an indentation 44c provided in the center of the curved face 44b.

The closing process is such that the open end of the work 41 between the die 45 and the cored bar 44 is gradually constricted by pressing the die 45 onto the work 41 with a force P while rotating the work 41, the cored bar 44 and the die 45 in the same direction. The bottom 31 is formed closing and sealing the opening into a conical cylinder. The bottom 31 inclines with an angle α with respect to a face which is orthogonal to the central axis O. The angle α is set for example to 30 degrees (π/6rad).

The central section of the bottom 31 is closed by constricting the work 41 between the die 45 and the cored bar 44. During this operation, a protrusion 34 is formed on the work 41 and projects into the indentation 44c of the cored bar 44. Consequently it is possible to ensure sealing of the bottom 31 by providing a protrusion 34 which projects into the outer shell 3 from the bottom 31.

The knuckle bracket 7 comprises an engaging section 7a which engages with the outer shell 3, a pair of flanges 7b which sandwich the knuckle, and a hose bracket 7g. Bolt holes 7c, 7d are formed on each flange 7b. A knuckle is fixed to the knuckle bracket 7 by two bolts inserted into the bolt holes 7c, 7d. In order to ensure dimensional accuracy, both bolt holes 7c, 7d undergo a drilling operation after the knuckle bracket 7 is fixed by welding to the outer shell 3. The knuckle bracket 7 is a single-plate type which is not provided with a reinforcing member between the flanges 7b.

The knuckle bracket 7 is fixed by welding after being press-fitted to the outer shell 3. It is possible to perform a smooth press-fitting operation on the outer shell 3 since the lower end of the outer shell 3 is drawn into a tapering shape using a closing process.

The upper and lower ends 7e, 7f of the single-plate type knuckle bracket 7 are fixed to the outer shell 3 by respective welded sections 21, 22.

Figure 4A:
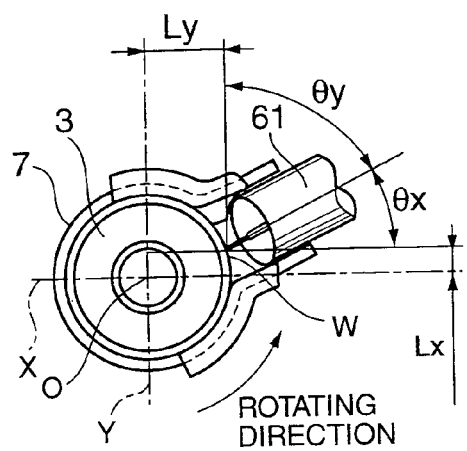
FIG. 4 shows a method of high-speed welding of the upper end of the knuckle bracket to the outer shell.
Figure 4B:
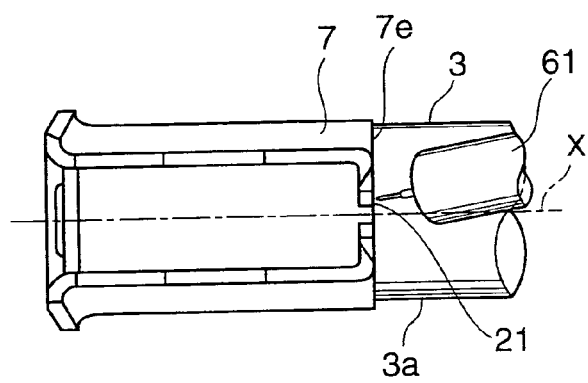
Figure 4C:
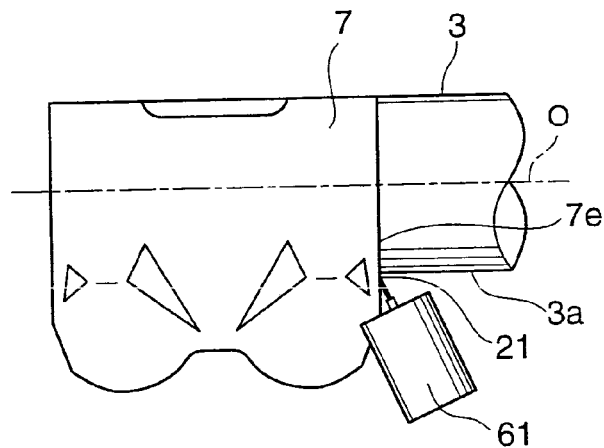

As shown by FIGS. 4(a), (b), (c), welded section 21 on the upper side of the bracket is welded using a vertical downward welding method with the torch 61 of the arc-welding unit oriented towards the corner between the outer peripheral face 3a of the outer shell 3 and the upper end 7e of the knuckle bracket 7. When applying this vertical downward welding method, the outer shell 3 is rotated about the central axis O which is disposed in a substantially horizontal plane. The torch 61 of the arc-welding unit is oriented to the lateral section of the outer shell 3. The direction in which the outer shell 3 is rotated is set to a direction in which the position of the outer shell 3 facing the torch 61 rises as shown by the arrow in FIG. 4(b).

The horizontal plane including the central axis O of the outer shell 3 is taken to be a horizontal reference plane X. The vertical plane including the central axis O of the outer shell 3 is taken to be a vertical reference plane Y. The welding point W is defined by the intersection of a line extended from the torch 61 of the arc-welding unit with the outer peripheral face 3a of the outer shell 3.

The welding point W is either offset onto the horizontal reference plane X or to a position above the horizontal reference plane X by a predetermined length Lx. In this embodiment, the outer radius of the outer shell 3 is approximately 45 mm and the offset amount Lx is set in the range 0–10 mm.

The welding point W is offset from the vertical reference plane Y by a predetermined length Ly. The vertical downward welding method is performing by disposing the welding point W so that the vertical offset amount Lx is smaller than the horizontal offset amount Ly.

The torch angle $\theta x$ of the torch 61 is inclined upwardly with respect to the horizontal reference plane X and is set to be smaller than the torch angle $\theta y$ inclined with respect to the vertical reference plane Y. In this embodiment, the torch angle $\theta x$ is set to the range 0–30 degrees (0–π/6 rad).

Figure 5:
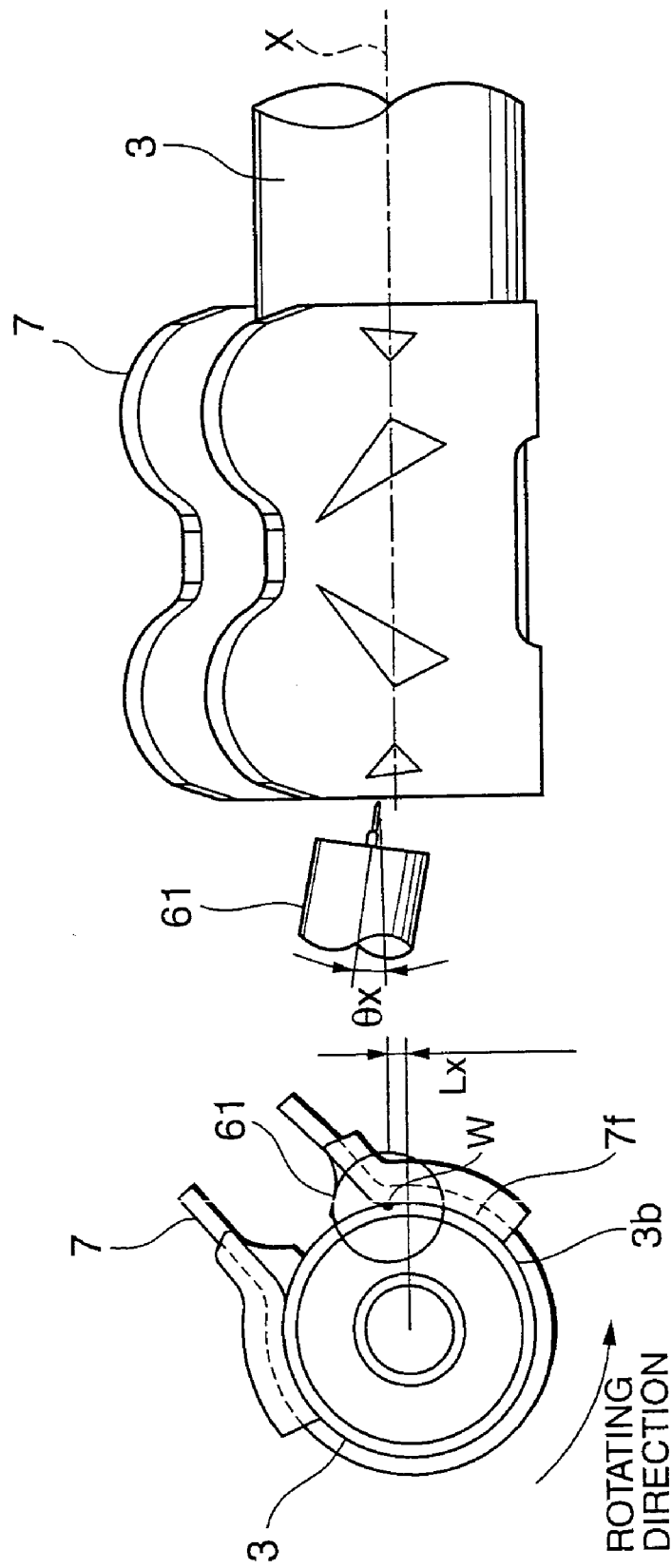
FIG. 5 shows a method of high-speed welding of the lower end of the knuckle bracket to the outer shell.

As shown in FIGS. 5(a), (b), the welded section 21 on the lower side of the bracket is welded using a vertical downward welding method with the torch 61 of the arc-welding unit oriented towards the corner between the lower end 3b of the outer shell 3 and the lower end 7f of the knuckle bracket 7. In this vertical downward welding method, the outer shell 3 is rotated about the central axis O which is disposed in a substantially horizontal plane. The direction in which the outer shell 3 is rotated is set to a direction in which the position of the outer shell 3 facing the torch 61 rises as shown by the arrow in FIG. 5(a).

The welding point W is either offset onto the horizontal reference line X or to a position above the horizontal reference plane X by a predetermined length Lx. In this embodiment, the outer radius of the outer shell 3 is approximately 45 mm and the offset amount Lx is set in the range 0–10 mm.

The torch angle $\theta x$ of the torch 61 is inclined upwardly with respect to the horizontal reference plane X is set to be smaller than the torch angle $\theta y$ inclined with respect to the vertical reference plane Y In this embodiment, the torch angle $\theta x$ is set to the range 0–15 degrees (0–π/12 rad).

The vertical downward welding method allows arbitrary setting of the offset amount Lx, the torch angle $\theta x$, as well as the rotation speed of the outer shell 3, the voltage and the current of the torch in response to the outer radius of the outer shell 3. A welding speed is obtained which is greater than that obtained by a welding device using a conventional flat welding method since a balance is produced between the welding speed and the drip rate of the flux.

Figure 6:
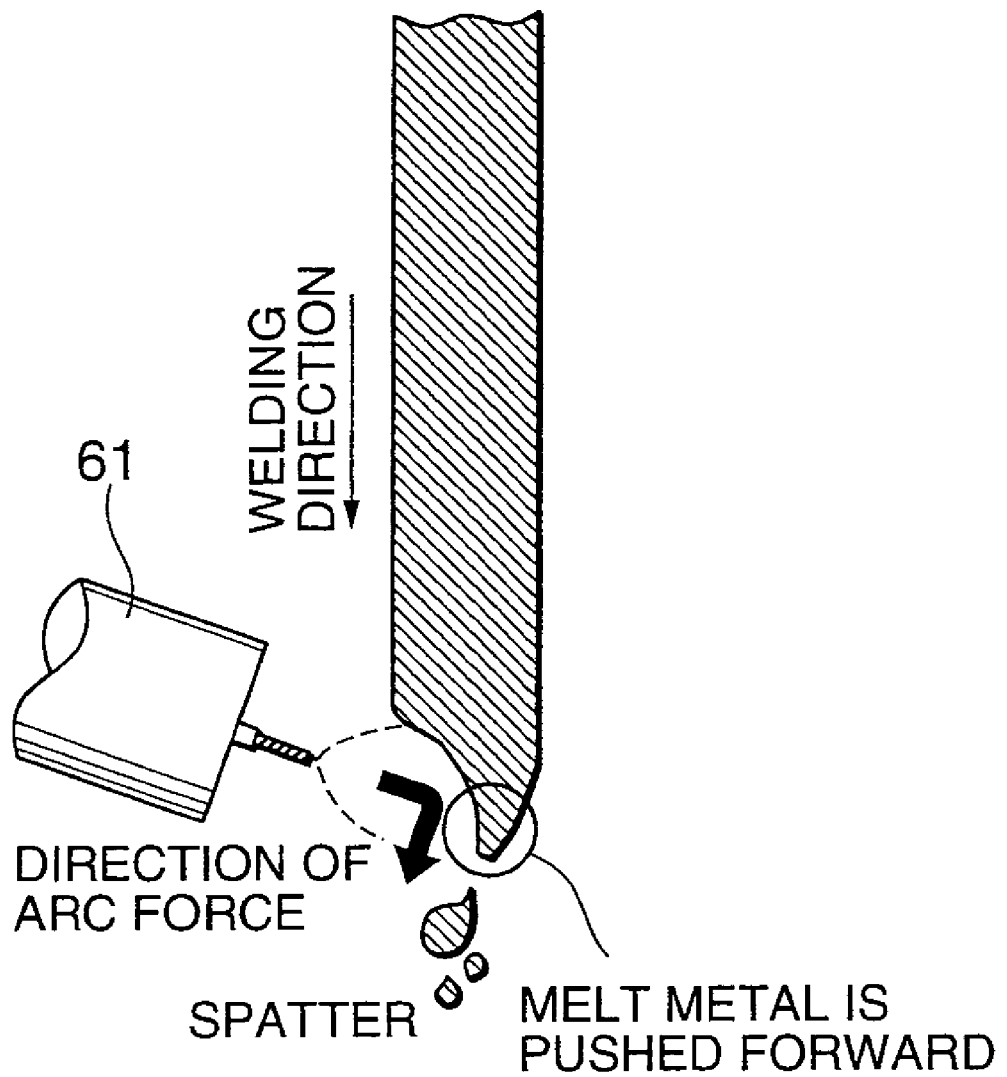
FIG. 6 shows the relationship of the spatter fall amount to the torch angle θx.

FIG. 6 shows the relationship between the torch angle $\theta x$ and the spatter fall amount. The arc force is applied on the flux as shown by the arrow in the drawing and presses the flux in a forward direction. As a result, when the torch angle θx is set above 30 degrees, the amount of spatter fall increases rapidly.

When the torch angle θx is set to a large value, the bead width increases. Although this results in an improvement to the outward appearance, it also tends to result in insufficient fusion or failure of fusion. Consequently the bead line may become indented and reduce insufficient component strength. Insufficient fusion may result in an excessive leading edge in the flux and create an arc-shaped residue over the flux.

Consequently a torch angle θx set in a range of 0–30 degrees allows the spatter fall amount to be suppressed and thus effectively suppresses insufficient fusion or failure of fusion.

When the welding point W is disposed below the horizontal reference plane X and the offset amount Lx is set to a negative value, the shape of the bead is adversely affected since gravity acts in a direction in which the flux becomes separated from the outer shell 3. Improved bead formation is obtained by disposing the welding point W above the horizontal reference plane X.

Figure 7:
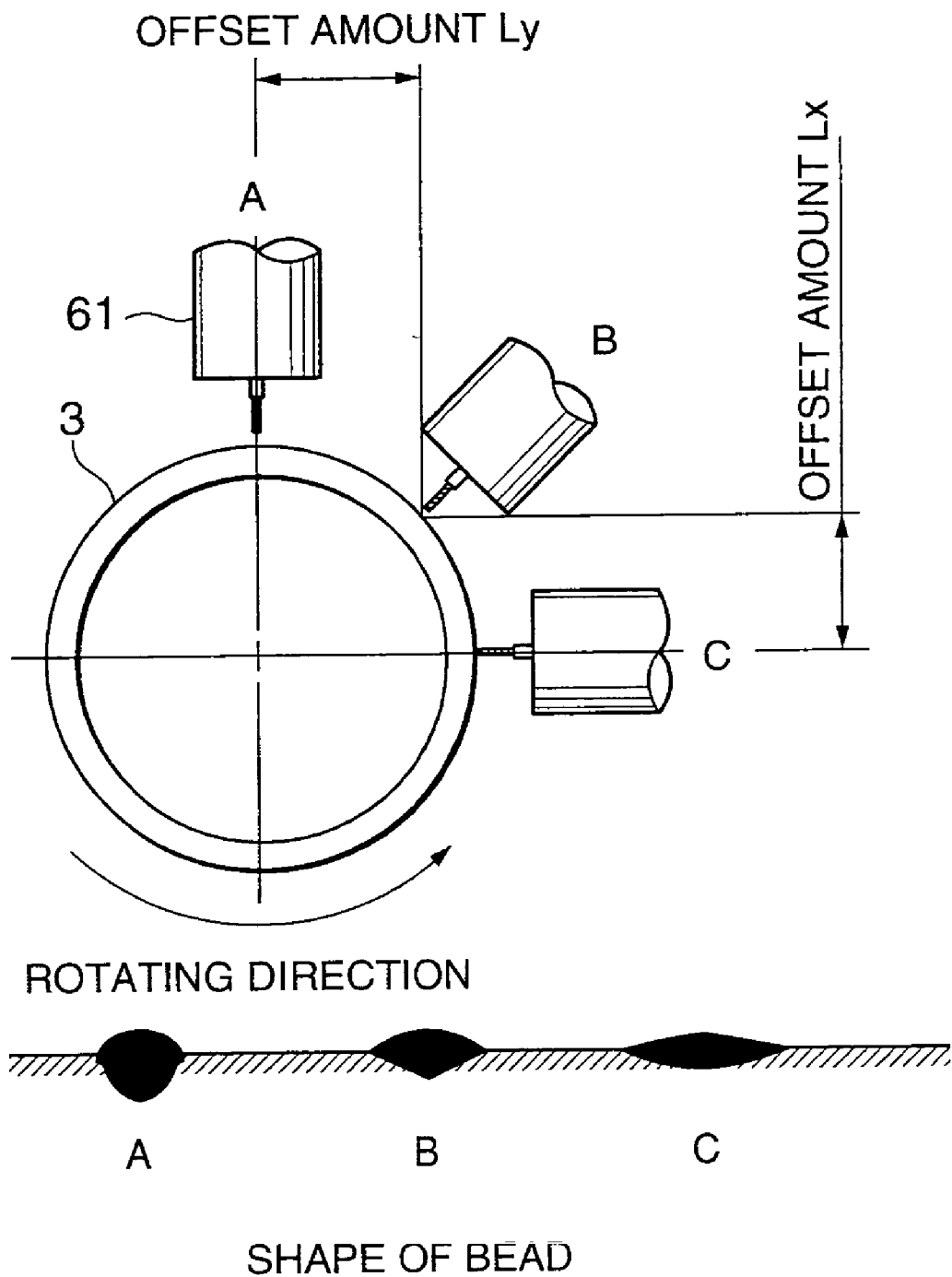
FIG. 7 shows the relationship of bead shape to the offset amount Lx, Ly of the welding point W.

FIG. 7 shows the general relationship of bead shape and the offset amount Lx, Ly of the welding point W located at A, B, and C. As the offset amount Lx decreases, the drip rate of the flux increases and the bead width increases. Conversely as the offset amount Lx increases, the drip rate of the flux decreases and the bead width narrows. When the rotation speed of the outer shell 3 is increased, the balance with respect to the drip rate for the flux fails and faults may result in the welding process.

When the knuckle bracket 7 is welded to the outer shell 3, the offset amount Lx of the welding point W with respect to the horizontal reference plane X is set to increase as the outer radius of the outer shell 3 increases. In this embodiment, when the outer radius of the outer shell 3 is set to approximately 45 mm and the offset amount Lx is set in a range of 0–10 mm, a suitable drip rate for the flux is obtained and improved bead formation characteristics are obtained.

Figure 8:
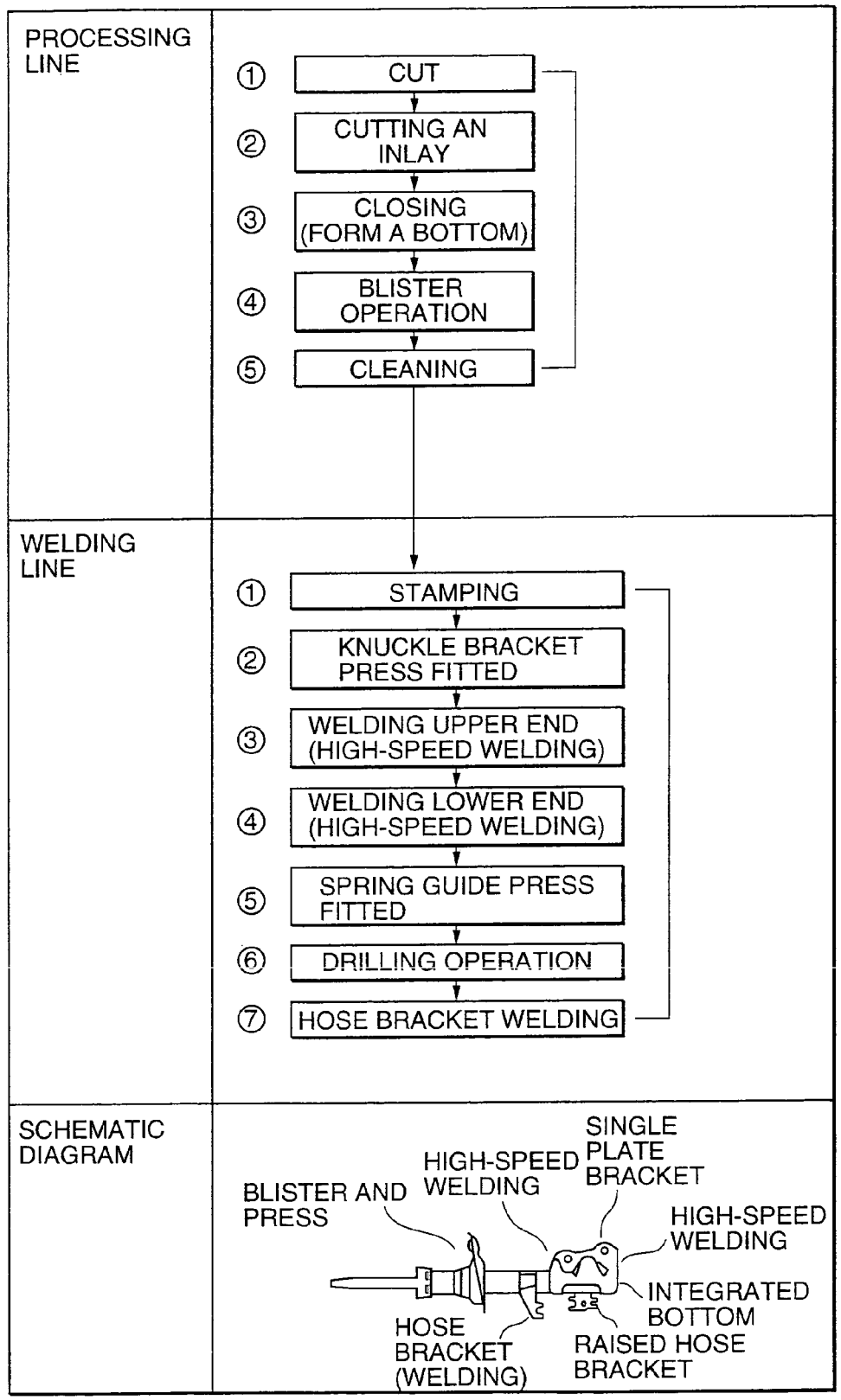
FIG. 8 shows the process of manufacturing an outer shell unit.

FIG. 8 shows the process of manufacturing an outer shell unit 10 comprising a spring guide 6, a knuckle bracket 7 and an outer shell 3. The production line manufacturing the outer shell unit 10 is separated into a processing line for the outer shell 3 which processes the outer shell 3, and a welding line for the outer shell unit 10 which mounts the spring guide 6 and the knuckle bracket 7 onto the outer shell 3. As a result, the turnover rate required to form a single outer shell 3 in the processing line is made equal to the turnover rate required to form a single outer shell unit 10 in the welding line.

Figure 9:
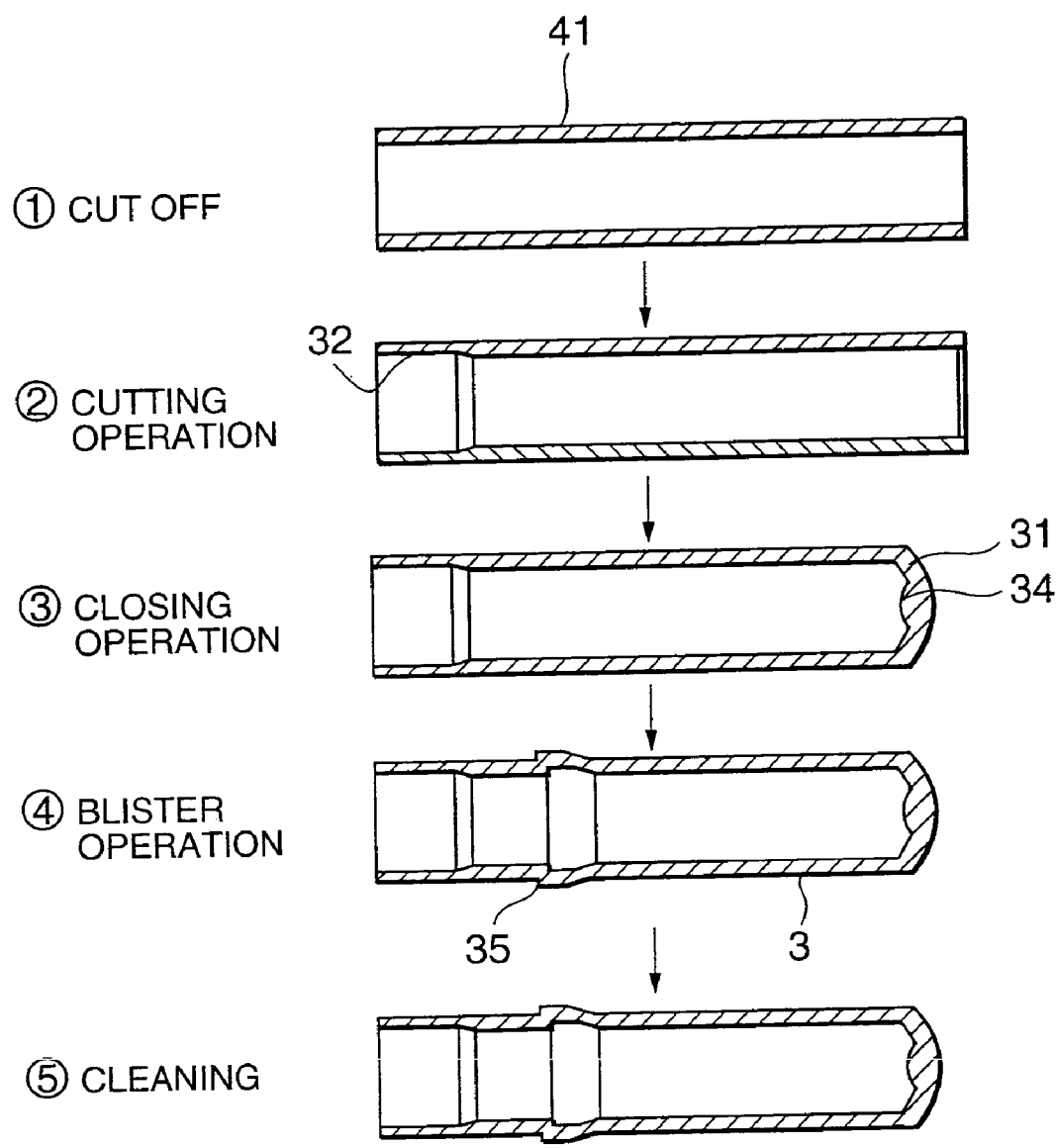
FIG. 9 shows the process of processing the outer shell.

The processing line process for the outer shell 3 comprises the sequence of the process in ①②③④⑤ as shown in FIG. 8 and FIG. 9.

① A pipe member is cut through in order to form a work 41 comprising a right circular cylinder.

② A cutting operation is performed on the inner periphery of one end of the work 41 in order to form an inlay 32. The rod guide 9 is engaged to the inlay 32 in a separate operation.

③ A closing process is performed on the other end of the work 41 in order to form a bottom 31.

④ A blister operation is performed along the work 41 in order to form a step 35.

⑤ The work 41 is cleaned.

The above processes are all automatically performed in a single production line.

The welding line for the outer shell unit 10 comprises the steps in ①②③④⑤⑥⑦ as shown in FIG. 8.

① A number or identification sign of the component is stamped on the work 41.

② The knuckle bracket 7 is press fitted to the outer shell 3.

③ The upper end 7e of the knuckle bracket 7 is high-speed welded using a vertical downward welding method to the outer peripheral face 3a the outer shell 3.

④ The lower end 7f of the knuckle bracket 7 is high-speed welded using a vertical downward welding method to the lower end 3b the outer shell 3.

⑤ The spring guide 6 is pressed fitted to the step 35 of the outer shell 3.

⑥ A drilling operation is performed on each bolt hole 7c, 7d in the knuckle bracket 7.

⑦ The hose bracket 8 is welded to the outer shell 3.

The above steps are all automatically performed in a single production line.

As a result, the turnover rate required to form a single outer shell 3 in the processing line is made equal to the turnover rate required to form a single outer shell unit 10 in the welding line. As a consequence, it is possible to effectively increase the production amount since it is not necessary to operate one line while resting the other.

In the processing line for the outer shell 3, since a bottom 31 is formed using a closing process, the number of operations required to assemble a lower cap or the number of operations required to cut the inlay or the number of drawing operations on the lower end of the outer shell 3 are reduced. Thus it is possible to shorten the cycle time required to form one outer shell 3 in the processing line.

In the welding line for the outer shell 3, the spring guide 6 is press fitted to the outer shell 3 and welding operations on both components are omitted. Furthermore the upper and lower ends 7e, 7f of the knuckle bracket 7 are high-speed welded using a vertical downward welding method on the outer shell 3. Thus it is possible to shorten the cycle time required to form a single outer shell unit 10 in the welding line.

It is possible to perform high-speed welding operations using a vertical downward welding method without the necessity to seal the bottom 31 by welding since sealing characteristics are ensured by use of a closing process on the bottom 31 of the outer shell 3.

Another embodiment of this invention is shown in FIGS. 10(*a*), (*b*). In this embodiment, the knuckle bracket 7 may be a cylindrical double-plate type in which a reinforcing member 15 may be provided between each flange 7b. The reinforcing member 15 is fixed between the flanges 7b in order to increase the rigidity of the knuckle bracket 7.

After the knuckle bracket 7 is press-fitted to the outer shell 3, only the lower end 7f of the knuckle bracket 7 is welded respectively to the outer shell 3. Consequently there is not necessity to fit the upper end 7e of the knuckle bracket 7 to the outer shell 3 by welding.

As shown in FIGS. 10(*a*), (*b*), a vertical downward welding method is used with the torch 61 of the arc-welding unit oriented towards the corner between the lower end 3b of the outer shell 3 and the lower end 7f of the knuckle bracket 7. In this vertical downward welding method, the outer shell 3 is rotated about the central axis O disposed in a substantially horizontal plane. The direction in which the outer shell 3 is rotated is set to a direction in which the position of the outer shell 3 facing the torch 61 rises as shown by the arrow in FIG. 10(*a*).

The welding point W is either offset onto the horizontal reference plane X or to a position above the horizontal reference plane X by a predetermined length Lx. In this embodiment, the outer radius of the outer shell 3 is approximately 45 mm and the offset amount Lx is set in the range 0–10 mm.

The torch angle θx of the torch 61 is inclined upwardly with respect to the horizontal reference plane X and is set to the range 0–30 degrees (0–π/6 rad).

Figure 11:
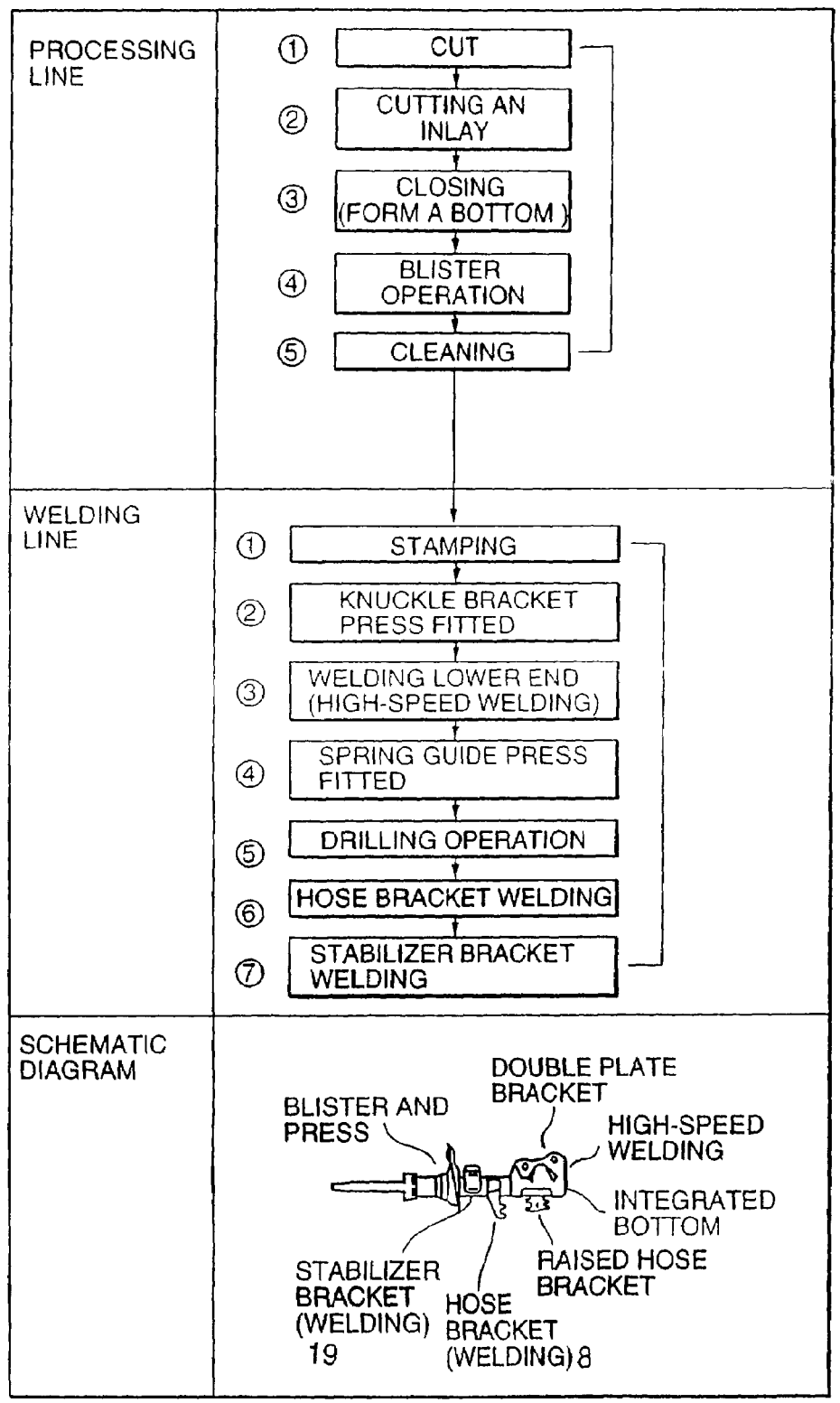
FIG. 11 shows the process of manufacturing the outer shell unit.

FIG. 11 shows the process of manufacturing an outer shell unit 10. The production line is separated into a processing line for the outer shell 3 which processes the outer shell 3, and a welding line for the outer shell unit 10 which mounts the spring guide 6 and the knuckle bracket 7 onto the outer shell 3. As a result, the cycle times of both lines is made equal.

The processing line for the outer shell 3 comprises the steps in ①②③④⑤ as shown in FIG. 11. This is the same as the processing line shown in FIG. 8. The welding line for the outer shell unit 10 comprises the steps in ①②③④⑤⑥⑦ as shown in FIG. 11.

① A number or identification sign of the component is stamped on the work 41.

② The knuckle bracket 7 is press fitted to the outer shell 3.

③ The lower end 7f of the knuckle bracket 7 is high-speed welded using a vertical downward welding method to the lower end 3b of the outer shell 3.

④ The spring guide 6 is pressed fitted to the step 35 of the outer shell 3.

⑤ A drilling operation is performed on each bolt hole 7c, 7d in the knuckle bracket 7.

⑥ The hose bracket 8 is welded to the outer shell 3.

⑦ The stabilizer bracket 19 is welded to the outer shell 3.

In comparison to the steps in the processing line as shown in FIG. 8 above, this welding line adds the step of welding the stabilizer bracket 19 to the outer shell 3 and omits the step of high-speed welding of the upper end 7e of the knuckle bracket 7 to the outer peripheral face 3a of the outer shell 3 using a vertical downward welding method.

Using a cylindrical double-plate knuckle bracket 7 allows the stabilizer bracket 19 to be welded to the outer shell 3 in the same cycle time as that taken in the processing line. This is due to the fact that it is not necessary to fit the upper end 7e of the knuckle bracket 7 to the outer shell 3 by welding.

Figure 12A:
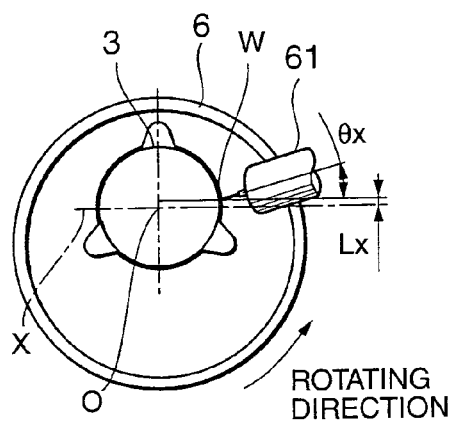
FIG. 12 shows a method of high-speed welding of the lower end of the knuckle bracket and the spring guide to the outer shell according to yet another embodiment.
Figure 12B:
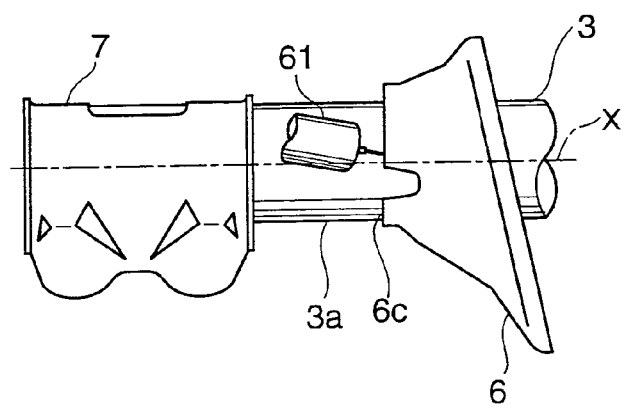
Figure 12C:
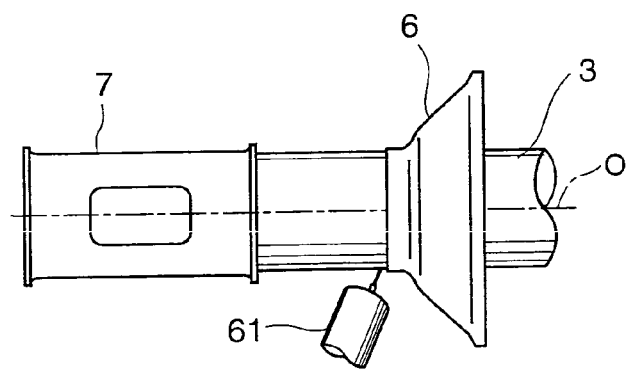

Another embodiment is shown in FIGS. 12(a), (b), (c). In this embodiment, the step 35 formed by a blister operation on the outer shell 3 is omitted and the spring guide 6 may be fixed by welding to the outer peripheral face 3a of the outer shell 3.

A cylindrical double-plate knuckle bracket 7 may be provided which has a reinforcing member 15 between each flange 7b.

After the spring guide 6 is press-fitted to the outer shell 3, the lower end 6c of the spring guide 6 is welded to the outer peripheral face 3a of the outer shell 3.

A high-speed welding operation comprising a downward welding method is used is used to weld the spring guide 6 to the outer peripheral face 3a of the outer shell 3. The torch 61 of the arc-welding unit is oriented towards the corner between the outer peripheral face 3a of the outer shell 3 and the lower end 6c of the spring guide 6. The outer shell 3 is rotated about the central axis O which is disposed in a substantially horizontal plane. The direction in which the outer shell 3 is rotated is set to a direction in which the position of the outer shell 3 facing the torch 61 rises as shown by the arrow in FIG. 12(a).

The welding point W is either offset onto the horizontal reference plane X or to a position above the horizontal reference plane X by a predetermined length Lx. In this embodiment, the outer radius of the outer shell 3 is approximately 45 mm and the offset amount Lx is set in the range 0–10 mm.

The torch angle θx of the torch 61 is inclined upwardly with respect to the horizontal reference plane X and is set to the range 0–15 degrees (0–π/12 rad).

Figure 13:
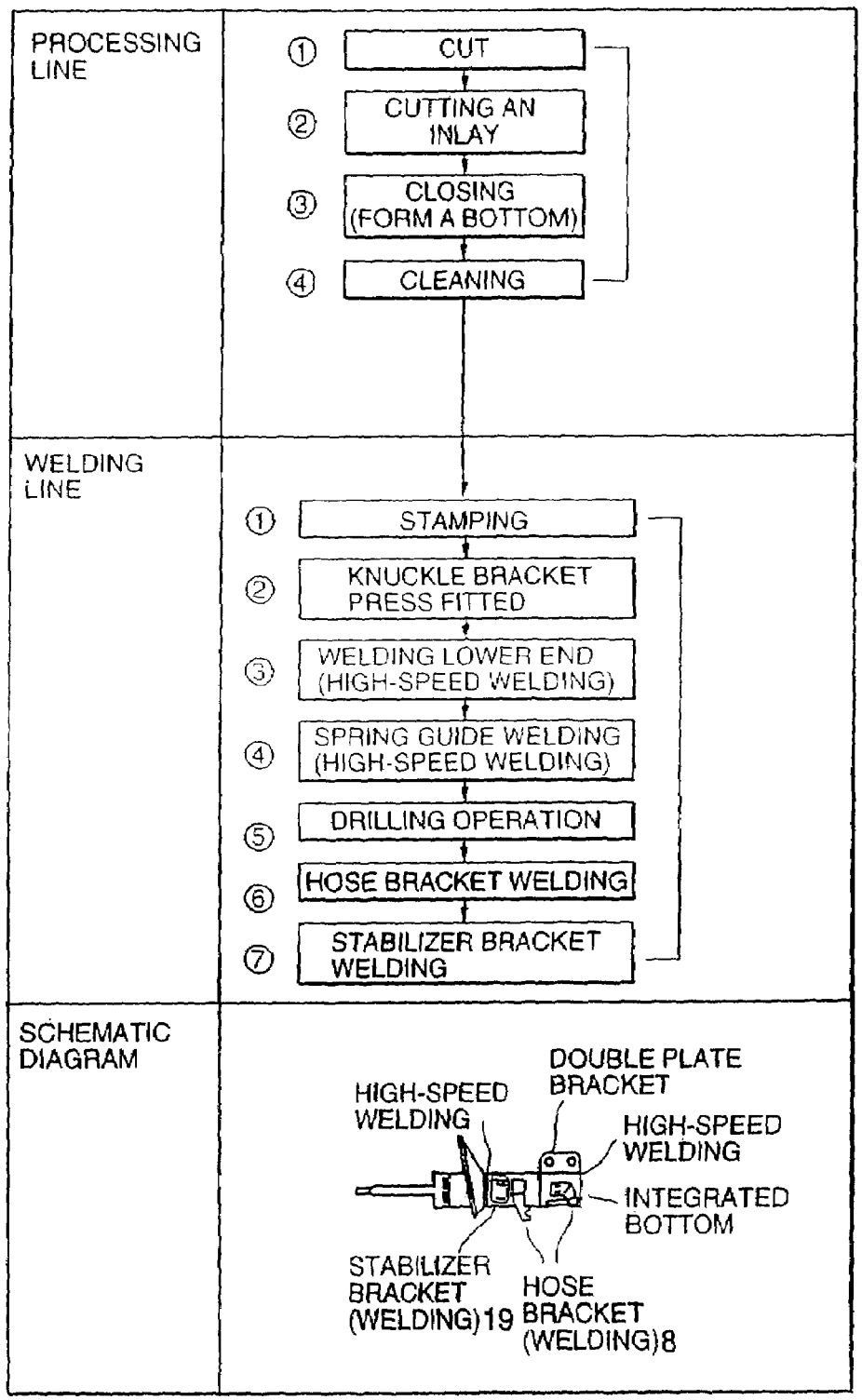
FIG. 13 shows the process of manufacturing the outer shell unit.

FIG. 13 shows the process of manufacturing an outer shell unit 10. The production line is separated into a processing line for the outer shell 3 which processes the outer shell 3, and a welding line for the outer shell unit 10 which mounts the spring guide 6 and the knuckle bracket 7 onto the outer shell 3. The cycle time of both lines is made equal.

The processing line for the outer shell 3 comprises the steps in ①②③④.

① A pipe member is cut through in order to form a work 41 comprising a right circular cylinder.

② A cutting operation is performed on the inner periphery of one end of the work 41 in order to form an inlay 32. The rod guide 9 is engaged to the inlay 32 in a separate step.

③ A closing process is performed on the other end of the work 41 in order to form a bottom 31.

④ The work 41 is cleaned.

In comparison to the steps in the processing line as shown in FIG. 8, the processing line omits the process of forming the step 35 with the blister process along the work 41.

The welding line for the outer shell unit 10 comprises the steps in ①②③④⑤⑥⑦.

① A number or identification sign of the component is stamped on the work 41.

② The knuckle bracket 7 is press fitted to the outer shell 3.

③ The lower end 7f of the knuckle bracket 7 is high-speed welded using a vertical downward welding method to the lower end 3b the outer shell 3.

④ The spring guide 6 is high-speed welded using a vertical downward welding process to the outer peripheral face 3a of the outer shell 3.

⑤ A drilling operation is performed on each bolt hole 7c, 7d in the knuckle bracket 7.

⑥ The hose bracket 8 is welded to the outer shell 3.

⑦ The stabilizer bracket 19 is welded to the outer shell 3.

In comparison to the steps in the processing line as shown in FIG. 8, the processing line adds the step of welding the stabilizer bracket 19 to the outer shell 3 and the step of welding the spring guide 6 to the outer shell 3 and omits the step of high-speed welding of the upper end 7e of the knuckle bracket 7 to the outer peripheral face 3a of the outer shell 3 and omits the step of press-fitting the spring guide 6 to the outer shell 3.

Using a cylindrical double-plate knuckle bracket 7 allows the stabilizer bracket 19 and the spring guide 6 to be welded to the outer shell 3 in the same cycle time as that taken in the processing line since it is not necessary to fit the upper end 7e of the knuckle bracket 7 to the outer shell 3 by welding.

The process of stamping a number or an identification sign of the component on the work 41 may be performed in the processing line.

Figure 14:
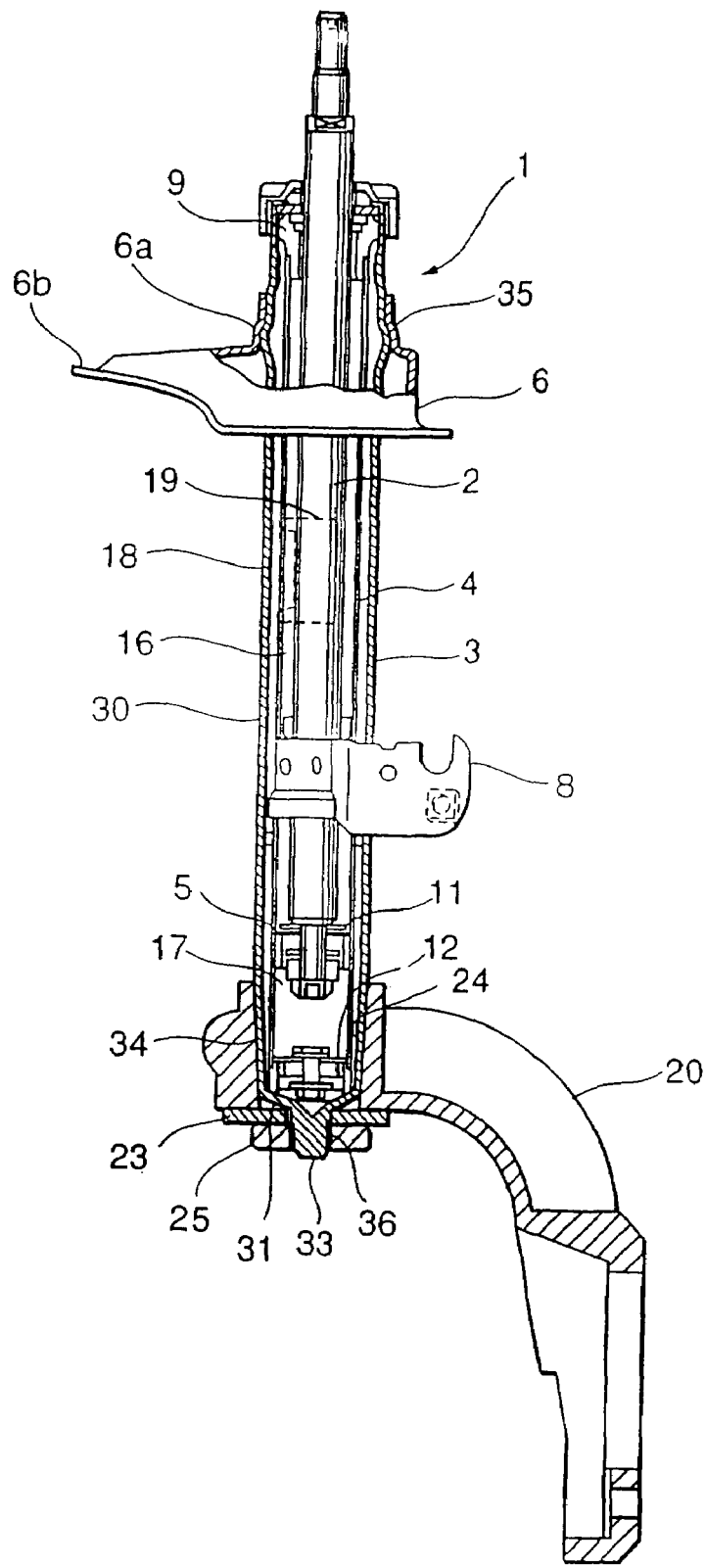
FIG. 14 shows a cross-sectional view of a shock absorber according to another embodiment.

In another embodiment as shown in FIG. 14, a knuckle 20 supporting the vehicle shaft may be directly fixed to the outer shell 3. The knuckle 20 has the function of positioning the vehicle wheel as a section of a suspension member.

The knuckle 20 has an engagement hole 24 which is engaged with the outer shell 3 from below. The outer shell 3 has a cylindrical main body 30 and a tapering section (a knuckle mounting section) engaging the engaging hole 24 of the knuckle 20 with the lower end of the main body 30. The tapering section 34 is inclined to taper downwardly and is engaged in the engagement hole 24 of the knuckle 20 which inclines in the same manner.

The outer shell 3 has a bottom 31 covering the lower end of the main body 30 and a threaded section 36 projecting from the bottom 31. The threaded section 36 projects downwardly through the engagement hole 24 of the knuckle 20.

A washer 23 and a nut 25 are provided. The washer 23 acts as a fixing member which is inserted into the threaded section 36 and abuts with the lower end face of the engagement hole 24 of the knuckle 20. The nut 25 acts as a fixing member which is threadably engaged with the threaded section 36. The engagement hole 24 of the knuckle 20 is engaged with the tapering section 34 of the outer shell 3 and fixed through the washer 23 by the nut 25 which is threadably engaged with the threaded section 36.

The protrusion 33 comprises a bottom 31, a threaded section 36 and a tapering section 34 of the outer shell 3. The protrusion 33 is integrated with the main body 30 of the outer shell 3 by a molding process termed a closing process. In this manner, the sealing characteristics of the bottom 31 of the outer shell 3 are ensured and it is not required to seal the bottom 31 by welding.

Figure 15:
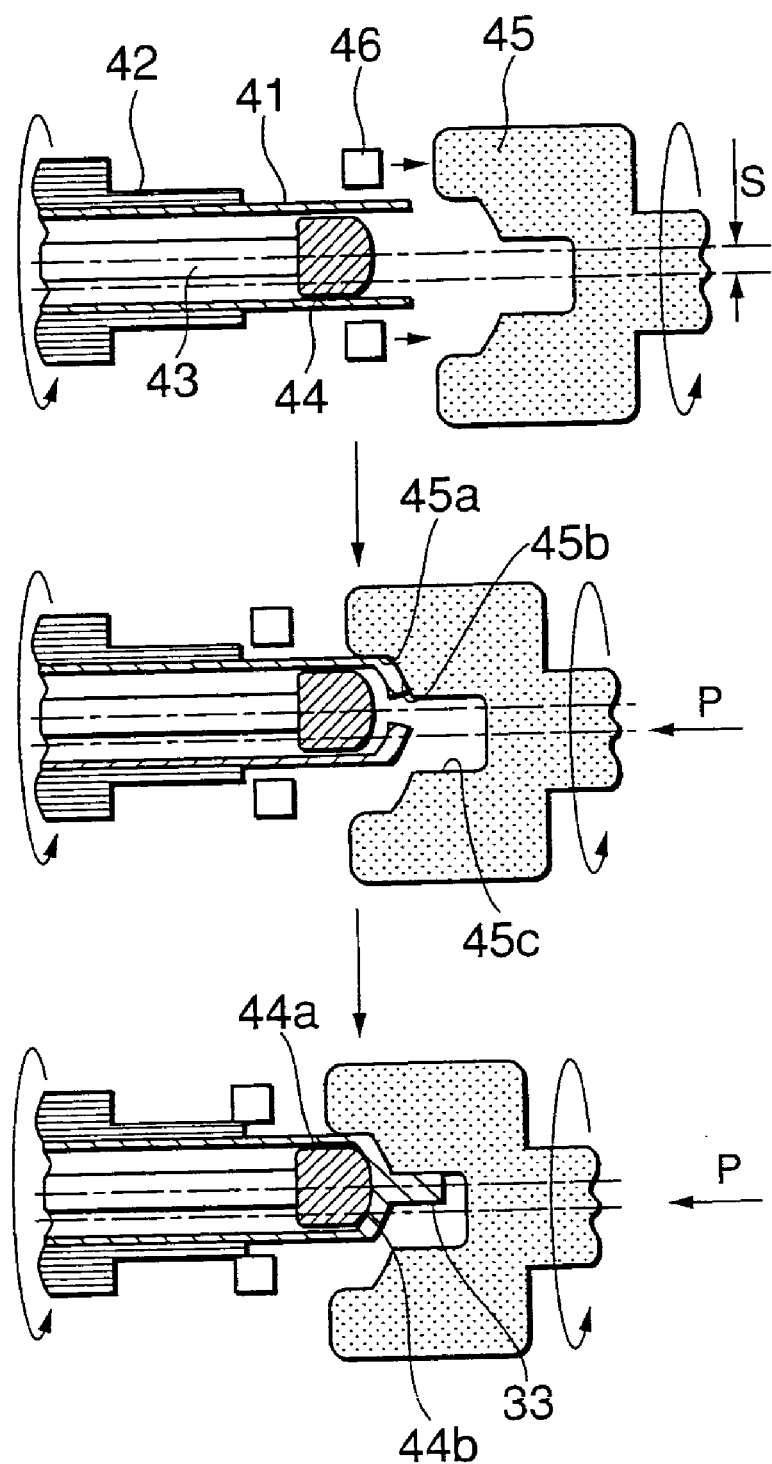
FIG. 15 shows the process of forming the bottom and the protrusion using a closing process.
Figure 16:
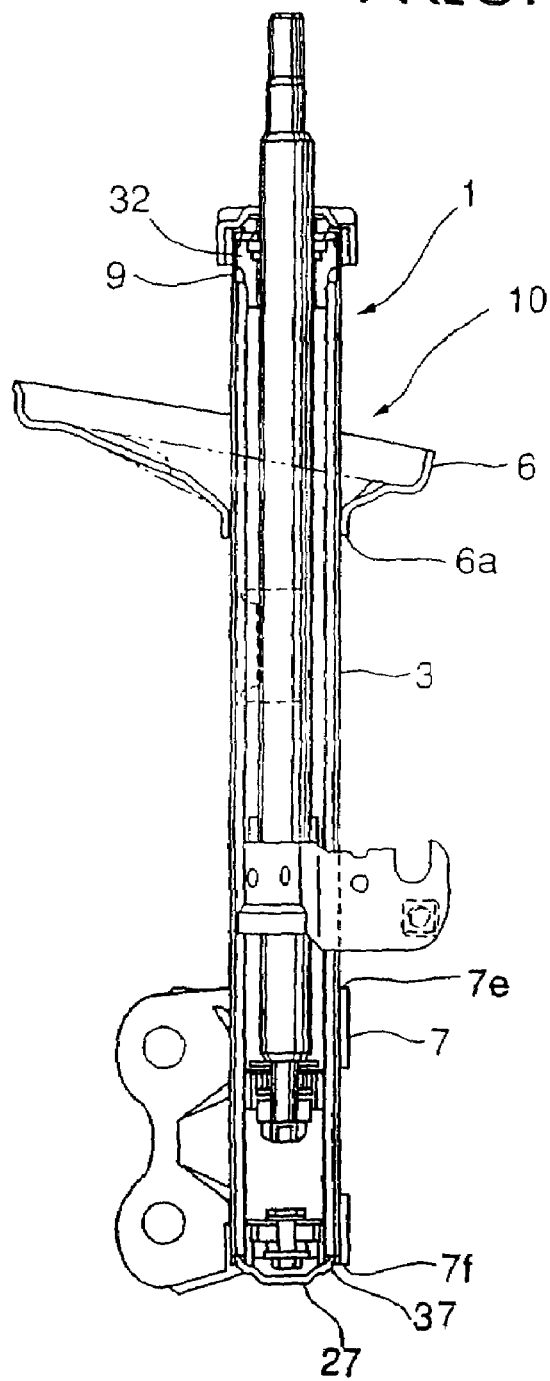
FIG. 16 is a cross section of a prior-art example of a shock absorber.
Figure 17A:
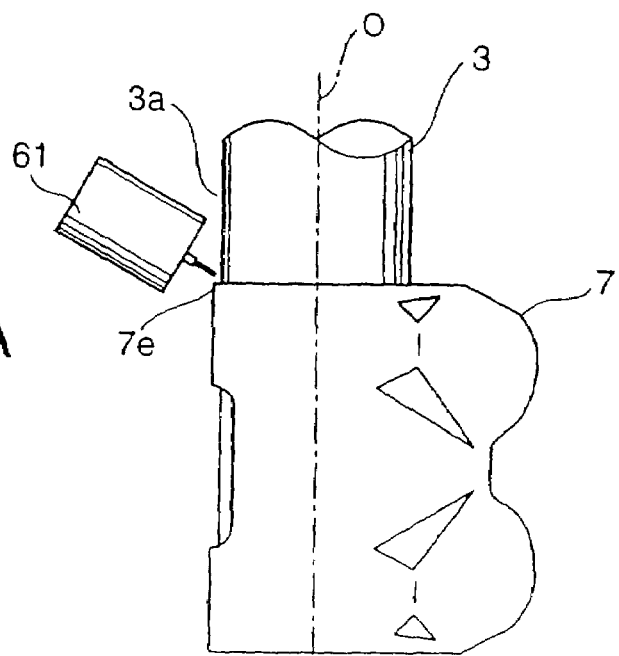
FIG. 17 shows a prior-art method of high-speed welding of the upper end of the knuckle bracket to the outer shell.
Figure 17B:
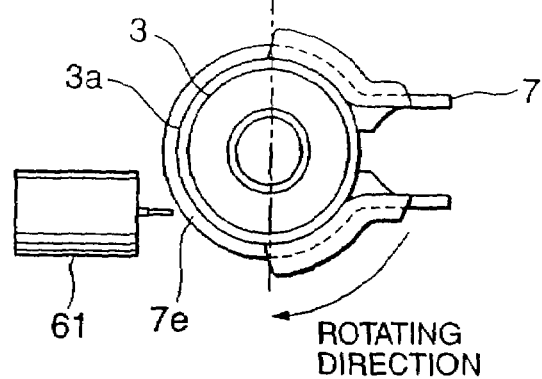
Figures 18A, 18B, 18C:
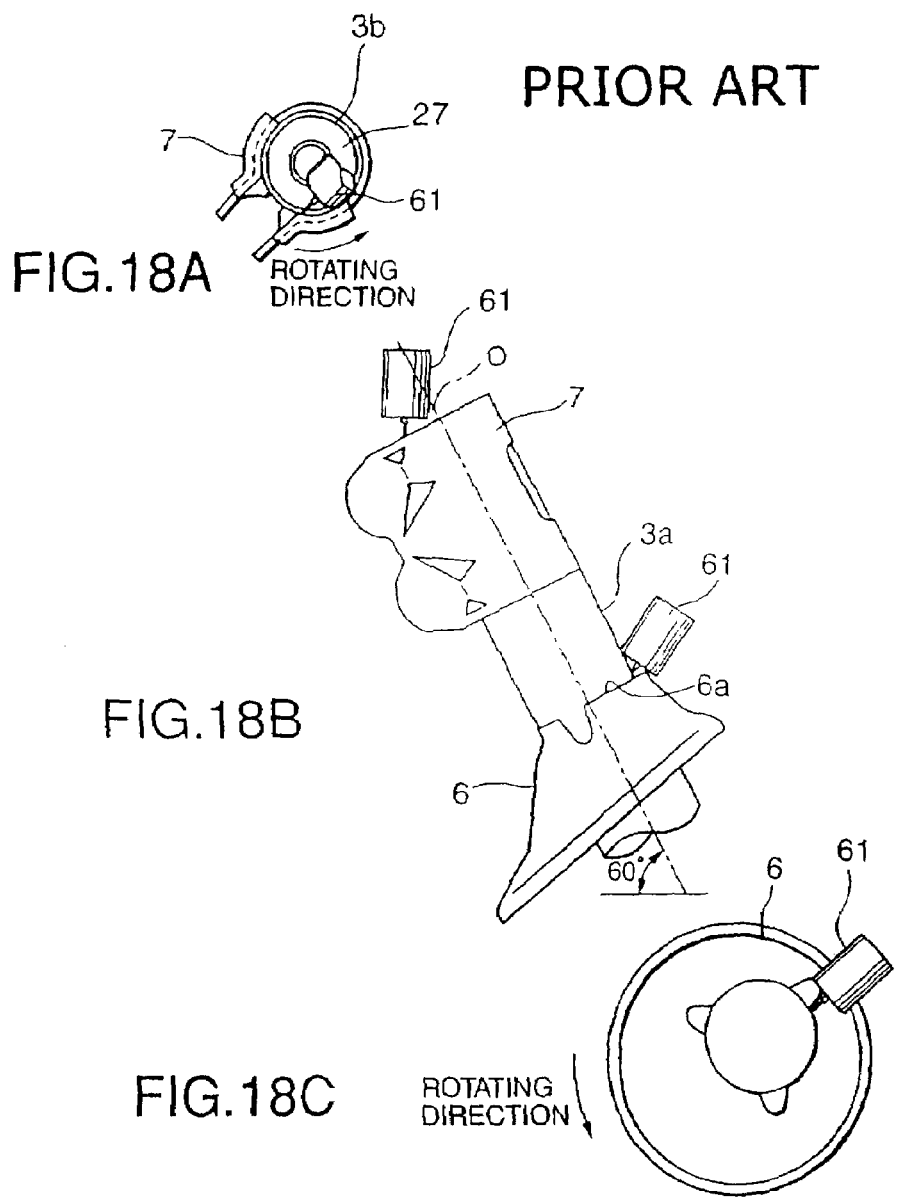
FIG. 18 shows a prior-art method of high-speed welding of the lower end of the knuckle bracket and the spring guide to the outer shell.
Figure 19:
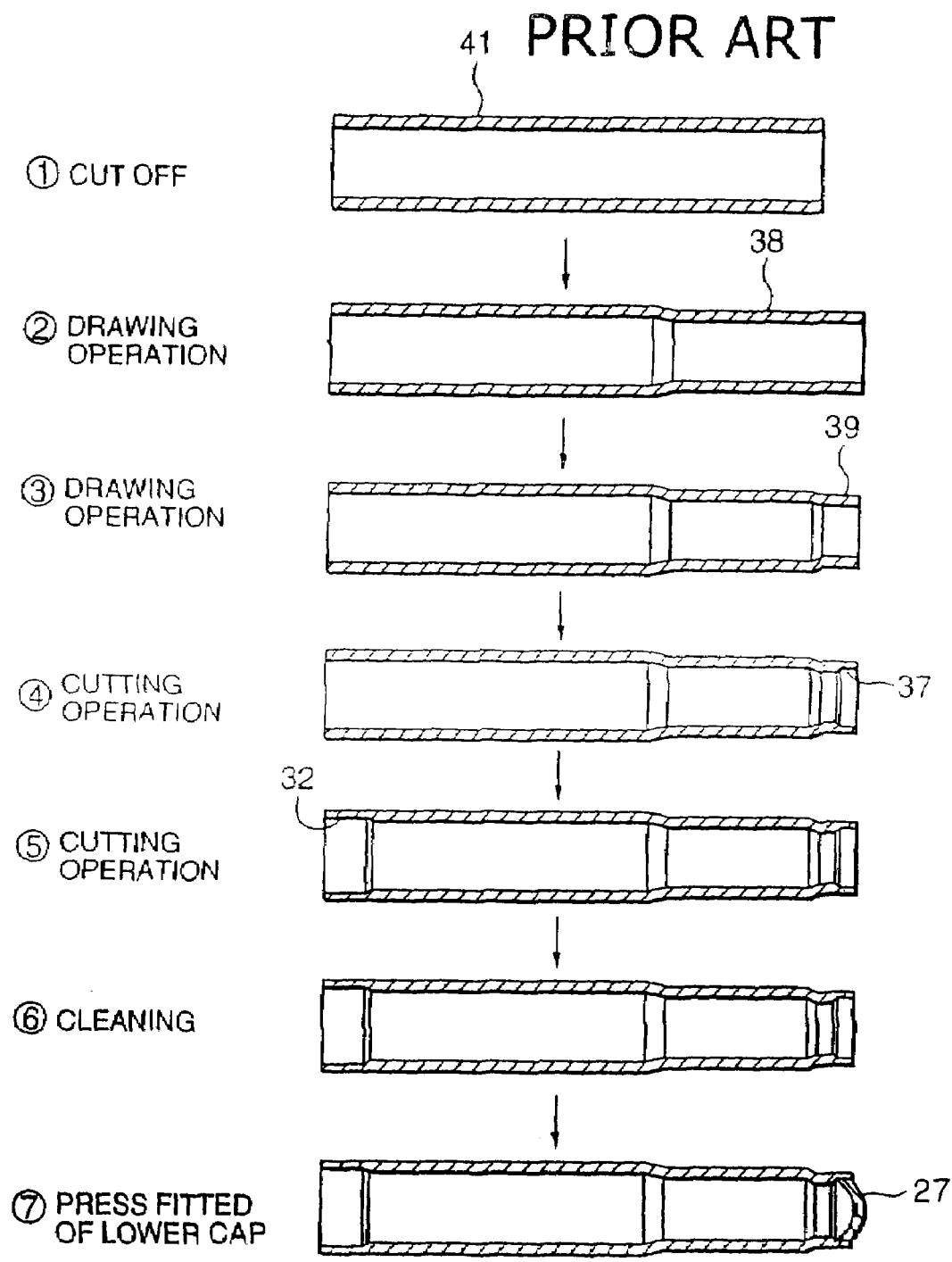
FIG. 19 shows the prior-art process of processing the outer shell.
Figure 20:
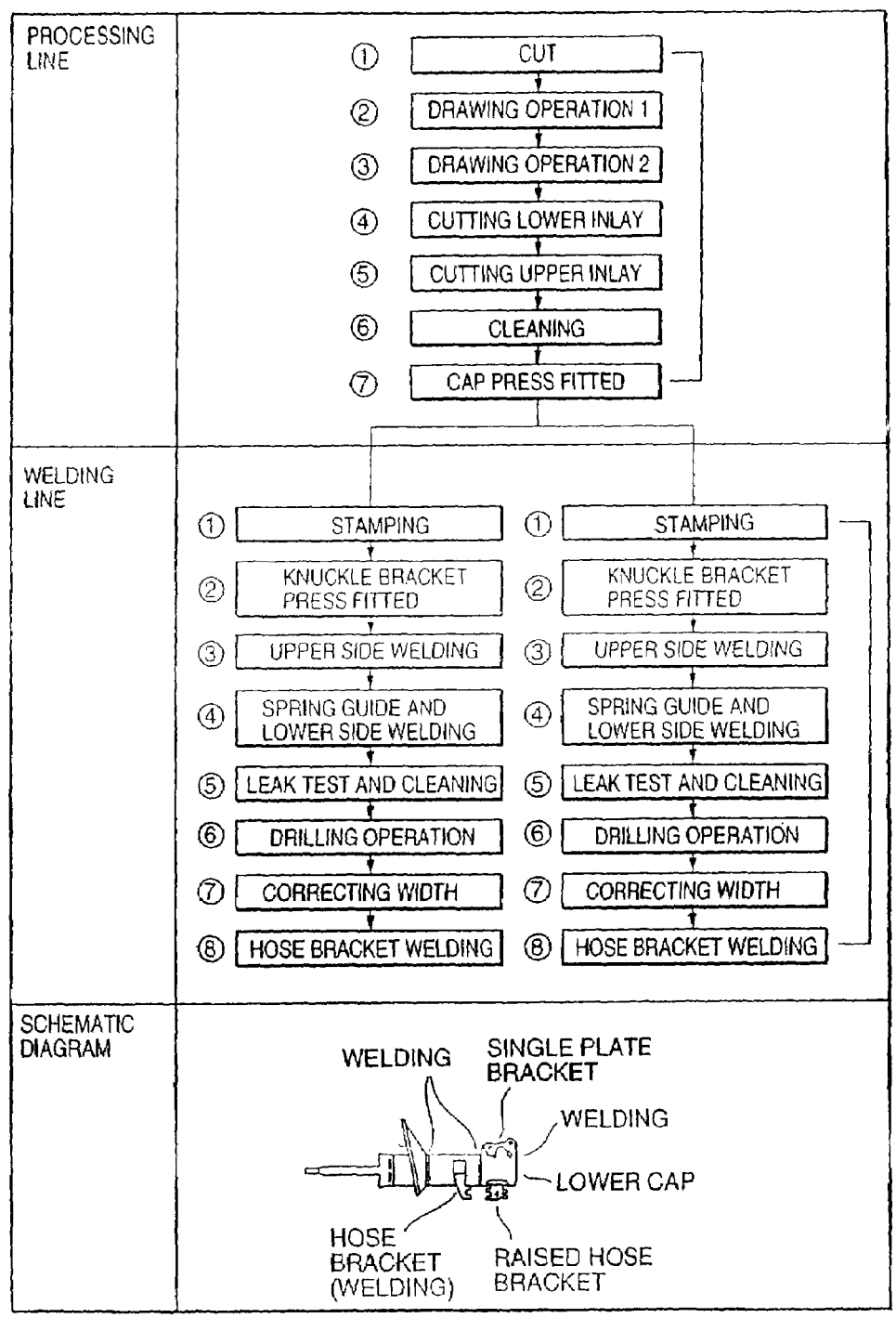
FIG. 20 shows the prior-art process of manufacturing the outer shell unit.

FIG. 15 shows the process of forming a protrusion 33, a bottom 31 and a tapering section 34 using the closing process. The closing processing unit comprises a chuck 42 retaining a work 41 such as a pipe member, a cored bar 44 disposed coaxially with respect to the work 41 by a retaining bar 43 on the inner side of the work 41, a die 45 rotating about a shaft having a predetermined offset S from the work 41 and a heating coil 46 heating the die 43. The work 41, the cored bar 44 and the die 45 are rotated in the same direction.

The die 45 has a cylindrical tapering face 45a formed in a concave tapering shape and a cylindrical inner peripheral face 45c formed in the center of a curved face 45b.

The cored bar 44 has a cylindrical outer peripheral face 44a, a curved face 44b projecting substantially in the shape of a sphere and an indentation 44c provided in the center of the curved face 44b.

The closing process is such that the open end of the work 41 between the die 45 and the cored bar 44 is gradually constricted by pressing the die 45 onto the work 41 with a force P while rotating the work 41, the cored bar 44 and the die 45 in the same direction. The bottom 31 is formed closing and sealing the opening into a conical cylinder.

The central section of the bottom 31 is closed by constricting the work 41 between the die 45 and the cored bar 44. During this operation, the protrusion 33 is formed to project into the indentation 45c of the die 45 on the work 41.

Threading is engraved onto the protrusion 33 by a mechanical process in order to form the threaded section 36.

As shown above, the knuckle 20 is engaged to the tapering section 34 of the outer shell 3 and is fixed by a nut 25 which is threadably engaged to the threaded section 36. As a result, the cycle time can be shortened and productivity can be thereby increased since the welding process in the prior-art example in which the knuckle bracket is welded onto the outer shell can be omitted.

It is not necessary to seal the bottom 31 by welding since the bottom 31 of the outer shell 3 is closed using a closing process. Thus closure of the bottom 31 can be ensured by providing a protrusion 33 projecting towards the outer side of the outer shell 3 from the bottom 31.

An annular step projecting from the outer peripheral face of the outer shell 3 may be formed as a knuckle mounting section which is inserted into the engagement hole 24 of the knuckle in the outer shell 3. Furthermore a member fixed between the nut 25 and the bottom 31 of the outer shell 3 may be formed in the knuckle 20.

Although the invention has been described above by reference to certain embodiments of the invention, the invention is not limited to the embodiments described above. Modifications and variations of the embodiments described above will occur to those skilled in the art, in the light of the above teachings.

INDUSTRIAL APPLICABILITY

As shown above, the outer shell unit and the method of manufacture therefore according to this invention is related to a shock absorber which damps vibration and shocks. In particular, the invention relates to an application to a strut-type shock absorber in a vehicle suspension system.

The invention claimed is:

1. A method of manufacturing an outer shell unit provided with a cylindrical outer shell housing a damping force generating mechanism and a knuckle bracket mounted on the outer shell to connect a knuckle, the method comprising the steps of;
   forming a bottom of the outer shell using a closing process which totally closes the bottom of the outer shell with a process using a cored bar disposed coaxially with the outer shell, the cored bar rotating with the outer shell, and a die pressing the bottom of the outer shell, the die rotating around a die axis having a predetermined offset from a rotation axis of the outer shell, and
   welding the knuckle bracket to the outer shell after forming the bottom.

2. The method of manufacturing an outer shell unit as defined in claim 1, wherein a vertical downward welding method is used to weld the lower end of the knuckle bracket to the outer shell.

3. The method of manufacturing an outer shell unit as defined in claim 1, wherein a protrusion projecting from the bottom of the outer shell is formed by the closing process.

4. The method of manufacturing an outer shell unit as defined in claim 1, further comprising the steps of,
   mounting a spring guide on the outer shell to support a suspension spring,
   forming a step by a bulge forming along the outer shell, and
   mounting the spring guide by press-fitting on the step.

5. The method of producing an outer shell unit of claim 1, wherein a spring guide is mounted on the outer shell to support a suspension spring, the method comprising the steps of;
   providing a processing line for the outer shell to form an outer shell from a pipe member using a mechanical process, and
   providing a welding line for the outer shell unit to mount a knuckle bracket and a spring guide on an outer shell, wherein the cycle time for forming one outer shell in the processing line is made substantially equal to the cycle time for welding one outer shell unit in the welding line.

6. The method of producing an outer shell unit as defined in claim 5, wherein a cylindrical double-plate knuckle bracket is mounted on the outer shell in the welding line and one end of the knuckle bracket is welded by a vertical downward welding method to the outer shell.

7. A method of welding an outer shell unit comprising a cylindrical outer shell housing a damping force generating mechanism and a suspension component welded to the outer shell, the method consisting of the steps of;

disposing a torch of an arc-welding unit in proximity to the welding position of a suspension component and the side of the outer shell, and welding the suspension component to the outer shell by rotating the outer shell unit so that the welded position facing the torch rises.

8. The method of welding an outer shell unit as defined in claim 7, wherein a horizontal plane including a central axis (O) of the outer shell is taken to be a horizontal reference plane (X), the point at which a line extended from the torch intersects with the outer shell unit is taken to be a welding point (W), and the welding point (W) is either on the horizontal reference plane (X) or offset to be above the horizontal reference plane by a vertical offset (Lx).

9. The method of welding an outer shell unit as defined in claim 8, wherein a vertical plane including the central axis (O) of the outer shell is taken to be a vertical reference plane (Y), the welding point (W) is offset from the vertical reference plane (Y) by a horizontal offset (Ly), and the vertical offset (Lx) is smaller than the horizontal offset amount (Ly).

10. The method of welding an outer shell unit as defined in claim 7, wherein a horizontal plane including the central axis (O) of the outer shell is taken to be the horizontal reference plane (X), the torch has a torch angle ($\theta x$) inclined upwardly with respect to the horizontal reference plane (X), and the torch angle ($\theta x$) is set in a range of 0–30 degrees.

* * * * *